(12) United States Patent
Tauchi et al.

(10) Patent No.: US 8,108,100 B2
(45) Date of Patent: Jan. 31, 2012

(54) INFORMATION PROCESSING APPARATUS

(75) Inventors: Nobutaka Tauchi, Toyoake (JP);
Tetsuya Oki, Nagoya (JP); Mikinari Yokoi, Ama-gun (JP); Shojiro Takeuchi, Tokyo (JP); Kazuya Sasaki, Sunto-gun (JP); Osamu Ozaki, Mishima (JP);
Masumi Kobana, Fuji (JP)

(73) Assignee: DENSO CORPORATION, Kariya (JP)

( * ) Notice: Subject to any disclaimer, the term of this patent is extended or adjusted under 35 U.S.C. 154(b) by 330 days.

(21) Appl. No.: 12/461,086

(22) Filed: Jul. 30, 2009

(65) Prior Publication Data

US 2010/0030419 A1 Feb. 4, 2010

(30) Foreign Application Priority Data

Aug. 1, 2008 (JP) ................................. 2008-200006

(51) Int. Cl.
*B60Q 1/04* (2006.01)
(52) U.S. Cl. ........................................................ 701/36
(58) Field of Classification Search ...................... 701/29
See application file for complete search history.

(56) References Cited

U.S. PATENT DOCUMENTS

| 3,925,244 | A | * | 12/1975 | Nagasawa et al. | 250/372 |
|---|---|---|---|---|---|
| 5,453,662 | A | * | 9/1995 | Gottlieb | 315/82 |
| 6,928,180 | B2 | * | 8/2005 | Stam et al. | 382/104 |
| 7,613,327 | B2 | * | 11/2009 | Stam et al. | 382/104 |
| 2008/0129206 | A1 | * | 6/2008 | Stam et al. | 315/82 |
| 2008/0157697 | A1 | * | 7/2008 | Yang et al. | 315/291 |
| 2008/0185207 | A1 | * | 8/2008 | Kondoh | 180/272 |
| 2008/0278100 | A1 | * | 11/2008 | Hwang | 315/360 |
| 2008/0319595 | A1 | * | 12/2008 | Yamamoto et al. | 701/22 |
| 2009/0034258 | A1 | * | 2/2009 | Tsai et al. | 362/253 |

FOREIGN PATENT DOCUMENTS

| DE | 10151796 A1 | * | 6/2003 |
|---|---|---|---|
| JP | A-H5-016722 | | 1/1993 |
| JP | A-11-310077 | | 11/1999 |
| JP | A-2001-116566 | | 4/2001 |
| JP | A-2005-280632 | | 10/2005 |
| JP | A-2006-209455 | | 8/2006 |

\* cited by examiner

*Primary Examiner* — Thomas G. Black
*Assistant Examiner* — Shelley Chen
(74) *Attorney, Agent, or Firm* — Posz Law Group, PLC

(57) ABSTRACT

When it is determined that a head light is turned on, the sunset time is calculated. Thus, the frequency of calculating the sunset time is significantly decreased as compared with that of continuously calculating the sunset time, thereby reducing the processing load. Further, as compared with the case where the sunset time is calculated regardless of the time of lighting on, the calculated sunset time can evaluate the time of lighting on appropriately.

8 Claims, 7 Drawing Sheets

INFORMATION PROCESSING APPARATUS

CROSS REFERENCE TO RELATED APPLICATION

The present application is based on and incorporates herein by reference Japanese Patent Application No. 2008-200006 filed on Aug. 1, 2008.

FIELD OF THE INVENTION

The present invention relates to an information processing apparatus to calculate a sunset time used for evaluating safe driving of a vehicle.

BACKGROUND OF THE INVENTION

Patent document 1: JP-H5-016722 A

In recent years, there are proposed many systems for urging drivers to the safe driving. Such a system evaluates the degree of safe driving of the driver based on various operations of the driver and notifies the driver of the evaluation result or score. For instance, one of items evaluated by the system is as to whether or not the head light is turned on before the sunset.

With respect to the head light turning on/off, Patent document 1 describes a technology, which detects illumination around the vehicle using a sensor and the head light is automatically turned on when the illumination is less than a predetermined threshold value. The predetermined threshold value in such automatic lighting-on technology is typically set to a value such that the head light is turned on appropriately in an averaged environment; thus, for example, it is not set such that the head light is turned on when the illumination around the vehicle is still enough for driving.

In this regard, however, it is useful for safe driving to turn on the head light even though the illumination around the vehicle is still enough. Assume the case that the driver turns on the head light a little earlier than the sunset based on the own intention, without depending on the above mentioned automatic lighting-on technology. Such a case or event can be evaluated as an action which contributes to the safe driving.

In order to evaluate the lighting-on of the head light at the time prior to the sunset, the corresponding system needs to understand the sunset time accurately. For instance, one method for understanding the sunset time obtains the time when the sun sets under the horizon based on the information on the latitude and longitude of the present position of the vehicle. The calculation required for the method contains the floating point arithmetic or trigonometric functions operation to thereby relatively increase the arithmetic load. If the sunset time is continuously calculated while considering the travel movement of the vehicle, a possibility may arise which affects execution of other functions of the same system.

In addition, the change of the sunset time accompanying the travel movement of the vehicle is very small if it is considered that the moving speed of the vehicle is about 100 km/h. Therefore, when considering the utilization efficiency of the operation resource of the system, it is not appropriate to continue calculating the sunset time.

SUMMARY OF THE INVENTION

The present invention is made in consideration of such a problem. It is an object to provide an information processing apparatus to calculate appropriately sunset time required for evaluating an event that a driver consciously or intentionally turns on a head light of a vehicle.

According to an example of the present invention, an information processing apparatus in a vehicle is provided as follows. A present time specification section is configured to specify a present time. A light information acquisition section is configured to acquire light information on lighting state of a head light of the vehicle. A position information acquisition section is configured to acquire position information for specifying a position where the vehicle presently exists. A calculation section is configured to calculate a sunset time in a position specified based on the position information acquired by the position acquisition section when it is determined that the head light of the vehicle is switched from a light-off state to a light-on state based on the light information acquired by the light information acquisition section. A lighting-on time specification section is configured to specify a lighting-on time when the head light of the vehicle is switched from the light-off state to the light-on state based on the present time specified by the present time specification section and the light information acquired by the light information acquisition section. An evaluation information storage section is configured to store the lighting-on time specified by the lighting-on time specification section and the sunset time calculated by the calculation section, in association with each other.

As an example of the present invention, an information processing apparatus in a vehicle is provided as follows. A present time specification section is configured to specify a present time. A light information acquisition section is configured to acquire light information on lighting state of a head light of the vehicle. A position information acquisition section is configured to acquire position information for specifying a position where the vehicle presently exists. A distance information acquisition section is configured to acquire distance information for specifying a distance which the vehicle travels. A calculation section is configured to specify a distance traveled by the vehicle based on the distance information acquired from the distance information acquisition section and calculate a sunset time in the position specified based on the position information acquired by the position information acquisition section every a predetermined distance traveled by the vehicle. A lighting-on time specification section is configured to specify a lighting-on time when the head light of the vehicle is switched from the light-off state to the light-on state based on the present time specified by the present time specification section and the light information acquired by the light information acquisition section. An evaluation information storage section is configured to store the lighting-on time specified by the lighting-on time specification section and the sunset time calculated by the calculation section, in association with each other.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

An embodiment according to the present invention will be explained with reference to drawings. In addition, the embodiment of the present invention can be modified in various manners within a technical scope of the present invention without being limited to the following embodiment.

[Explanation of Configuration]

Figure 1:
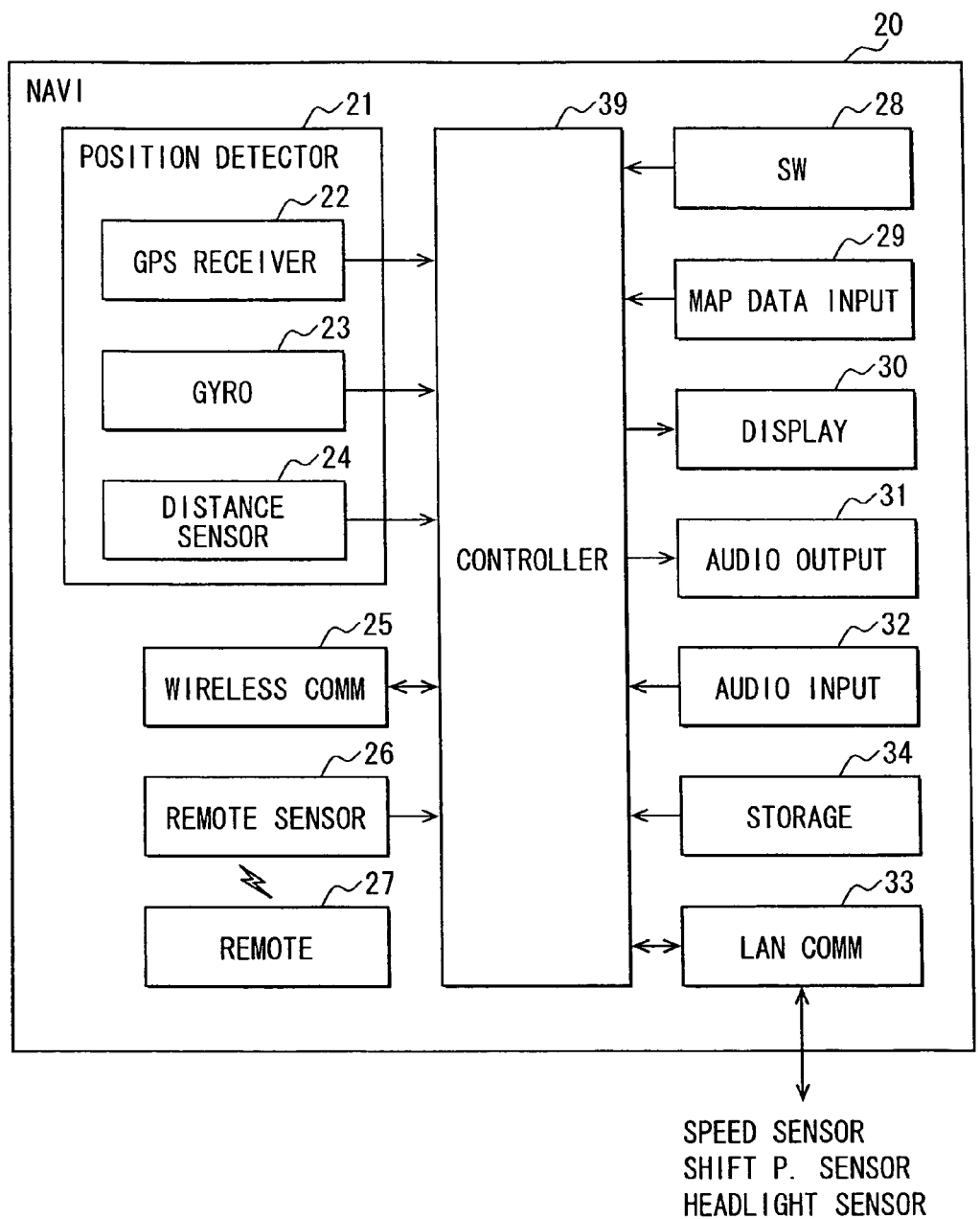
FIG. 1 is a block diagram showing a configuration of a navigation apparatus according to an embodiment of the present invention.

FIG. 1 is a block diagram illustrating a schematic configuration of a navigation apparatus 20 having a function of an information processing apparatus according to an embodiment of the present invention.

The navigation apparatus 20 is mounted in a subject vehicle. The navigation apparatus 20 includes the following: a position detection section 21 to detect a present position of the vehicle or a position where the vehicle exists presently; a wireless communication section 25 to wirelessly communicate with an outside; an operation switch group 28 to input various instructions from a user; a remote control terminal 27 (also referred to as a remote) provided as a different body unit from the main body of the navigation apparatus 20 for inputting various instructions from the user like the operation switch group 28; a remote control sensor 26 to input a signal from the remote control terminal 27; a map data input section 29 to input data from a map storage medium for recording map data or audio data; a display section 30 to display a map or a variety of information; an audio output section 31 for outputting various kinds of guidance sounds; an audio input section 32 to input sounds uttered by the user etc. and transform them into audio signals; an in-vehicle LAN communication section 33 to communicate with various ECUs etc., which are connected thereto; a storage section 34 to store a variety of information; and a controller 39. The controller 39 executes various processes based on inputs from the position detection section 21, the wireless communication section 25, the operation switch group 28, the remote control sensor 26, the map data input section 29, the audio input section 32, the in-vehicle LAN communication section 33, and the storage section 34. Further, the controller 39 controls the wireless communication section 25, the display section 30, the audio output section 31, the in-vehicle LAN communication section 33, and the storage section 34.

The position detection section 21 includes the following: a GPS receiver (also called a GPS signal reception section) 22 which receives via a GPS antenna (not shown) electric waves from satellites for GPS (Global Positioning System) and outputs reception signals to the controller 39; a gyroscope 23 which detects rotational movement exerted to the vehicle and outputs the detection result to the controller 39; and a distance sensor 24 which detects a travel distance the vehicle travels and outputs the detection result to the controller 39. Based on signals outputted from sensors or the like 22 to 24, the controller 39 calculates a position, direction, speed, etc. of the vehicle. In addition, although there are several methods to calculate a present position based on a signal outputted from the GPS receiver 22, an independent positioning method or a relative positioning method may be used.

The operation switch group 28 includes a mechanical key switch arranged in the circumference of the display section 30 and a touch sensitive panel laminated on and integrated into a surface of the screen on the display section 30. In addition, although the touch panel includes various types to detect a user's manipulation such as a pressure-sensitive type, an electromagnetic induction type, a capacitive sensing type, or a type combining the foregoing, any type may be used in the present embodiment.

The remote control terminal 27 includes several buttons. When one of the buttons is pressed, a signal corresponding to the type of the pressed button is transmitted to reach the remote control sensor 26 using the short range wireless such as infrared rays.

The remote control sensor 26 receives the signal sent from the remote control terminal 27, and outputs the received signal to the controller 39. The wireless communication section 25 acquires accident information, congestion information, etc. from the information center of VICS (Vehicle Information and Communication System) via the light beacon, the radio wave beacon, etc. which are installed in road sides, or acquires sightseeing guidance information etc. from a server via the packet communication network.

The map data input section 29 is used for inputting various data stored in the map data storage media such as a hard disk or DVD-ROM (none shown). The map data storage medium stores map data, POI data, audio data for guidance, speech recognition data, etc. The map data includes node data, link data, road width data, road type data, road regulation data, link travel time, road name data, and intersection data. The POI data includes POI name data, genre data, and position data. In addition, the data may be acquired through a communication network instead of acquiring the data from the map data storage medium.

The display section 30 includes a liquid crystal display or an organic electroluminescence display. The display section 30 displays a map and associated data in superimposition. The associated data include a present position mark indicating a present position of the vehicle, which is specified from a present position detected by the position detection section 21 and the map data inputted from the map data input section 29; a guidance route to a destination; names, landmarks, facility marks, etc. In addition, the guidance of the facilities, etc. can be also displayed.

The audio output section 31 has a speaker and can output via the speaker audio signals inputted from the controller 39 as sounds. The audio input section 32 has a microphone and can output audio signals based on the user's sounds inputted via the microphone to the controller 39. The user can input instructions by speech to the navigation apparatus 20 by speaking to the microphone.

The in-vehicle LAN communication section 33 carries out communication with various kinds of ECUs (engine ECU, AT-ECU, brake ECU, etc.) and various kinds of sensors (speed sensor, shift position sensor, head light sensor, etc.) which are connected to the in-vehicle LAN (not shown).

The storage section 34 includes a nonvolatile medium, for example, hard disk, SSD, etc., to store various kinds of information. The controller 39 includes a known microcomputer having a CPU, DRAM, ROM, flash memory, I/O, and a bus line connecting the foregoing. The controller 39 executes various processes based on programs stored in the ROM or flash memory. For instance, the following processes are executed. A process is to calculate a present position of the vehicle as a set of coordinates and a heading direction based on each detection signal from the position detection section 21, read a map near the present position from the map data input section 29, and display the read map in the display section 30. A process is to calculate an optimal route from a present position to a destination based on the map data read via the map data input section 29, and the destination set up when the operation switch group 28 or remote control terminal 27 is operated by the user. A process is to perform a route guidance by displaying the calculated optimal route in the display section 30 and/or by outputting corresponding guidance speeches via the audio output section 31. In addition, the controller 39 internally contains a clock to use a present clock time, and an elapsed time starting from a specific time point for executing various processes.

[Explanation of Operation]

Next, an example of an operation of the navigation apparatus 20 is explained. The explanation focuses on the portion relevant to the present invention while eliminating the present position display process, route calculation process, route guidance process, etc. generally included in the navigation apparatus.

(1) Booting-Up Process

Figure 2:
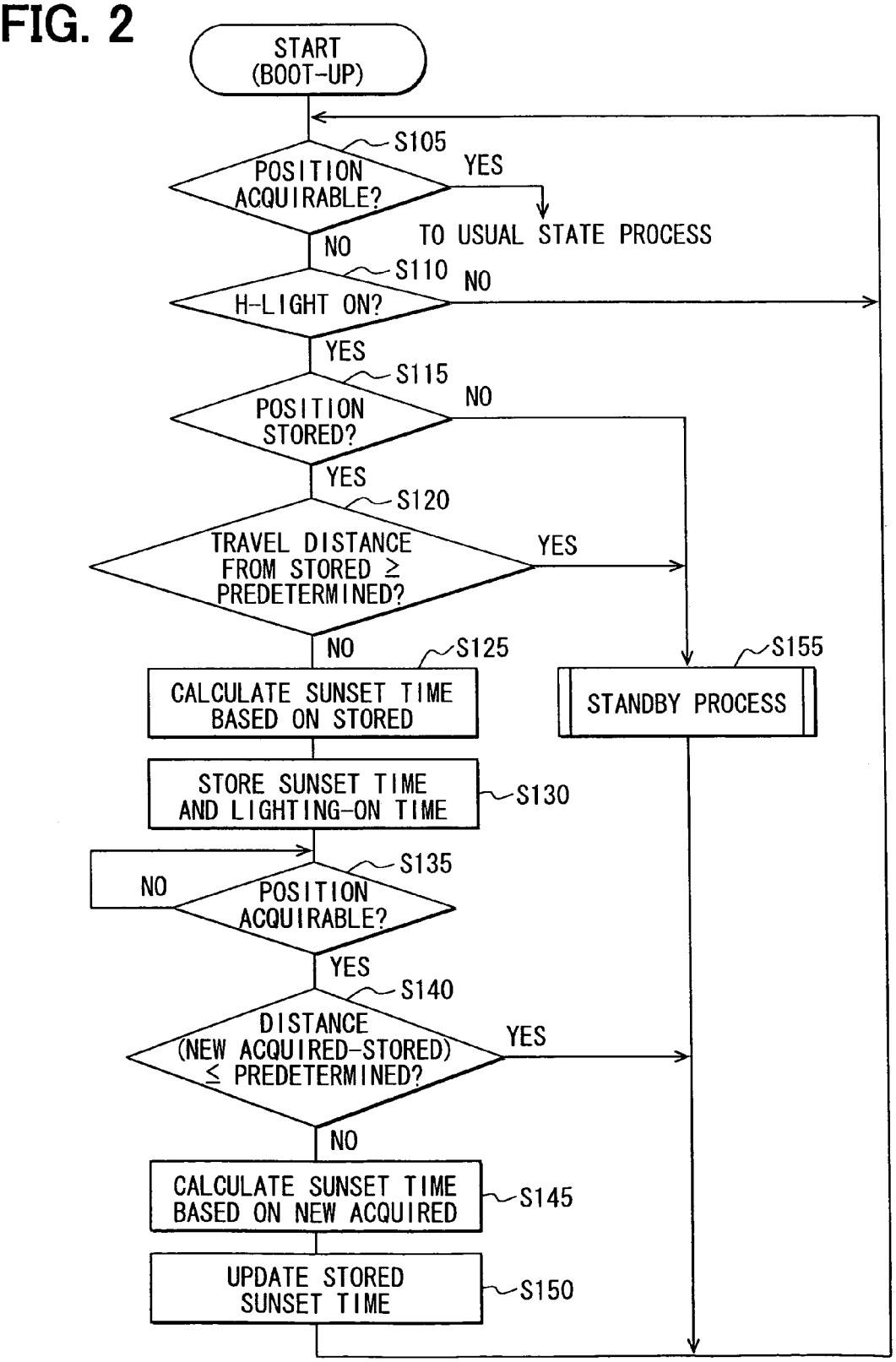
FIG. 2 is a flowchart diagram for explaining a booting-up process.

Next, a booting-up process (i.e., activation process or start-up process) executed by the navigation apparatus 20 is explained using a flowchart of FIG. 2. Furthermore, execution of the present process is started when the electric power supply to the navigation apparatus 20 is started, for instance, when the accessory switch of the vehicle is turned on or switched into an ON state from an OFF state.

The controller 39 of the navigation apparatus 20 determines first whether the coordinates of the position of the subject vehicle is acquirable (S105). There are two methods to acquire the coordinates of the position of the subject vehicle. It is determined whether the coordinates of the position can be acquired using either of the two methods. A first method is to receive signals from the GPS Satellite and calculate the present position based on the reception signal from the GPS receiver 22. The first method is able to calculate the present position when signals from at least three GPS Satellites are receivable. A second method is able to calculate the present position by obtaining the relative movement locus or track of the vehicle starting from the reference position based on signals from the gyroscope 23 and the distance sensor 24. The second method is able to calculate the present position when the reference position can be set up using the above mentioned first method etc. In this regard, however, it is desirable such that the error of the present position resulting from the accumulated error in the movement locus is suppressed within a predetermined range; thus, when the travel distance exceeds a predetermined distance, it may be designed that the calculation of the present position is not executed.

When the controller 39 determines that the acquisition of the coordinates of the position of the subject vehicle is possible (S105: Yes), the processing advances to the usual state process (refer to FIG. 4), which is mentioned later. When it is determined that the acquisition of the coordinates of the position of the subject vehicle is impossible (S105: No), the processing advances to S110.

At S110 performed when it is determined that the acquisition of the coordinates of the position of the subject vehicle is impossible, the controller 39 determines whether a head light of the vehicle is changed into the light-on state from the light-off state. The light-on state of the head light is determined based on the signal acquired from the head light sensor 25 via the in-vehicle LAN communication section 33. When the controller 39 determines that the head light is changed into the light-on state from the light-off state (S110: Yes), the processing advances to S115. In contrast, it is determined that the head light is not changed into the light-on state from the light-off state (S110: NO), the processing returns to S105. In contrast, it is determined that the head light is changed into the light-on state from the light-off state (S110: YES), the controller 39 stores the present time as a head light lighting-on time for subsequent S130 mentioned later in the DRAM inside of the controller 39.

At S115 performed when it is determined that the head light is changed into the light-on state from the light-off state, the controller 39 determines whether the coordinates of the position of the subject vehicle is stored in the internal flash memory. The coordinates of the position of the subject vehicle corresponds to the coordinates stored at S310 of the usual state process executed before the execution of the present booting-up process. When it is determined that the coordinates of the position of the subject vehicle is stored in the inner flash memory (S115: Yes), the processing advances to S120. When it is determined that the coordinates of the position of the subject vehicle is not stored in the inner flash memory (S115: No), the processing advances to S155.

At S120 performed when it is determined that the coordinates of the position of the subject vehicle is stored in the inner flash memory, It is determined whether the travel distance from the stored coordinates of the position of the subject vehicle is equal to or greater than a predetermined distance. Furthermore, the predetermined distance is appropriately set so as to depart far from the stored coordinates of the position of the subject vehicle to disable the lighting-on diagnosis of the head light at the sunset time calculated based on the stored coordinates of the position of the subject vehicle. In other words, if the subject vehicle travels the predetermined (travel) distance from the stored coordinates, the sunset time which is calculated based on the stored coordinates cannot be used validly in the lighting-on diagnosis. In addition, the travel distance may be counted or measured from the time of storing the coordinates of the position of the subject vehicle, or calculated based on the travel route history.

When the controller 39 determines that the travel distance from the coordinates of the position of the subject vehicle stored in the flash memory is equal to or greater than the predetermined distance (S120: Yes), the processing advances to S155. When the controller 39 determines that the travel distance from the coordinates of the position of the subject vehicle stored in the flash memory is less than the predetermined distance (S120: No), the processing advances to S125.

At S125 performed when it is determined that the travel distance is less than the predetermined distance, the controller 39 calculates the sunset time based on (i) the subject vehicle position coordinates stored in the flash memory and (ii) the information on the present date and month obtained from the internal clock. The calculation method of the sunset time is known widely; thus, explanation is omitted. For instance, the calculation method is described in the book titled "the sunrise and sunset calculation" (Chijin Shokan: December, 1999 publication).

Subsequently, the controller 39 stores (i) the sunset time calculated at S125 and (ii) the time (head light lighting-on time) when it is determined that the head light is changed into the light-on state from the light-off state at S110, in the storage section 34, in association with each other. Furthermore, the time (i.e., clock time) is obtained from the clock inside the controller 39.

Next, the controller 39 of the navigation apparatus 20 determines whether the coordinates of the position of the subject vehicle is acquirable (S135). The acquisition method of the coordinates of the position of the subject vehicle is the same as that explained at S105 mentioned above. When the controller 30 determines that the acquisition of the coordinates of the position of the subject vehicle is possible (S135: Yes), the processing advances to S140. When it is determined that the acquisition of the coordinates of the position of the subject vehicle is impossible (S135: No), the processing remains at the present step until the coordinates of the position of the subject vehicle becomes acquirable.

At S140 performed when it is determined that the acquisition of the coordinates of the position of the subject vehicle is possible, the controller 39 determines whether the distance in a straight line between the coordinates of the position of the subject vehicle stored in the inner flash memory and the newly acquired coordinates of the position of the subject vehicle is equal to or less than a predetermined distance. Furthermore, the predetermined distance is appropriately set such that the coordinates of the position of the subject vehicle stored in the flash memory is separated enough from the newly acquired coordinates of the position of the subject vehicle to disable the lighting-on diagnosis of the head light at the sunset time calculated based on the stored coordinates of the position of the subject vehicle. In other words, if the difference between the coordinates stored in the flash memory and the newly acquired coordinates is greater than the predetermined distance, the sunset time which is calculated based on the stored coordinates cannot be used validly in the lighting-on diagnosis.

When the controller 39 determines that a straight distance between the coordinates of the position of the subject vehicle stored in the flash memory and that newly acquired is equal to or less than the predetermined distance (S140: Yes), the processing returns to S105. In contrast, when the controller 39 determines that a straight distance between the coordinates of the position of the subject vehicle stored in the flash memory and that newly acquired is not greater than the predetermined distance (S140: No), the processing advances to S145.

At S145 performed when the controller 39 determines that a straight distance between the coordinates of the position of the subject vehicle stored in the flash memory and that newly acquired is not greater than the predetermined distance, the controller 39 calculates the sunset time based on the present position coordinates acquired newly.

Then, the controller 39 updates by replacing the sunset time stored in the storage section 34 at S130 with the sunset time calculated at S145 (S150). The controller 39 then returns the processing to S105 mentioned above.

At S155, performed by the negative determination at S115 or the affirmative determination at S120, the controller 39 executes a standby process mentioned later. When the controller 39 finishes the standby process, the controller 39 or the processing then returns to S105 mentioned above.

Thus the booting-up process is explained. The following explains an effect or advantage acquired when the controller 39 executes the present booting-up process. Immediately after starting the electric power supply to the navigation apparatus 20, the controller 39 may not acquire the signal from the position detection section 21 (S105: No). Even in such a case, the sunset time is calculated based on the coordinates of the position of the subject vehicle stored in the flash memory built in the controller 39 (S125). Accordingly, such processing can help prevent the situation where lighting-on time of the head light cannot be stored on the grounds that the sunset time is incalculable.

Further, when the controller 39 determines that the travel distance from the coordinates of the position of the subject vehicle stored in the flash memory is equal to or greater than the predetermined distance (S120: Yes), the coordinates of the position of the subject vehicle stored in the flash memory is not used, but the standby process mentioned later is executed, the coordinates of the position of the subject vehicle is newly acquired in the process. Such a configuration can prevent the sunset time from being calculated based on too old position information.

Further, when the electric power supply to the navigation apparatus 20 is started, the controller 39 calculates the sunset time based on the coordinates of the position of the subject vehicle stored in the flash memory before the coordinates of the position of the subject vehicle becomes acquirable. In such a case, When the coordinates of the position of the subject vehicle becomes acquirable, the controller 39 determines whether the distance in a straight line between the coordinates of the position of the subject vehicle stored in the inner flash memory and the newly acquired coordinates of the position of the subject vehicle is equal to or less than a predetermined distance (S140). When it is determined that the use of the coordinates of the position of the subject vehicle stored in the flash memory is unsuitable (S140: No), the sunset time is calculated based on the coordinates of the position of the subject vehicle newly acquired (S145). Thus, the sunset time calculated based on the unsuitable coordinates of the position of the subject vehicle can be prevented from being used for the evaluation.

(2) Standby Process

Figure 3:
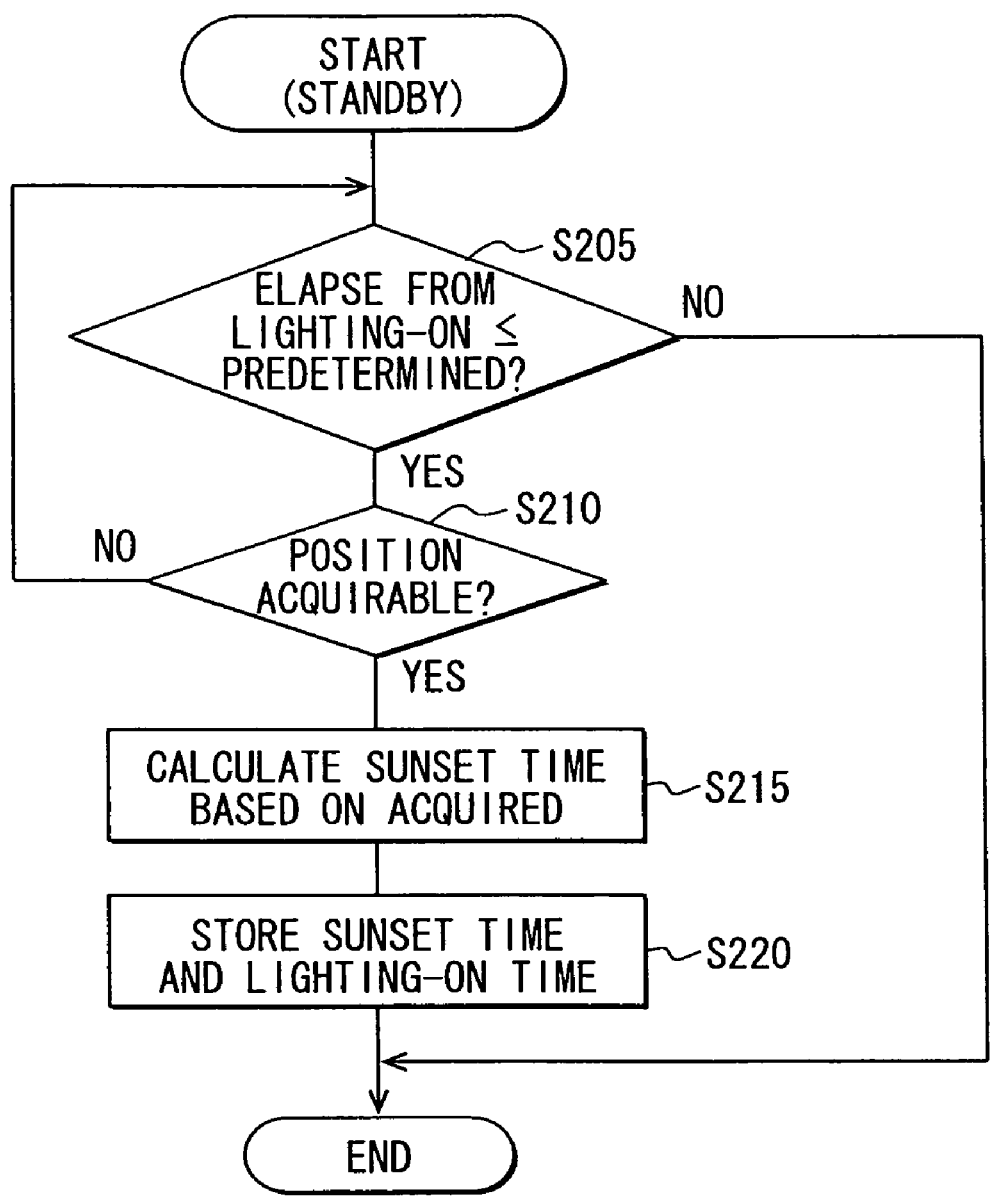
FIG. 3 is a flowchart diagram for explaining a standby process.

Next, the standby process is explained using a flowchart of FIG. 3. Furthermore, the standby process is started by being called at S155 of the booting-up process or S350 of the usual state process mentioned later.

The controller 39 of the navigation apparatus 20 determines first whether the elapsed time from the head light lighting-on time is equal to or less than a predetermined time (S205). More specifically, the head light lighting-on time signifies the time or clock time when it is determined that the head light is changed into the light-on state from the light-off state at S110 of the booting-up process or S330 of the usual state process mentioned later. The head light lighting-on time is stored in the DRAM in the controller 39. In addition, the predetermined time may be defined such that the change of the sunset time undergone when the subject vehicle (in which the navigation apparatus 20 is mounted) moves for the duration of the same predetermined time does not have significant influence on the diagnostic result (mark) in the diagnosis process mentioned later.

When the controller 39 determines that the elapsed time from the head light lighting-on time is equal to or less than the predetermined time (S205: Yes), the controller 39 or the processing advances to S210. In contrast, when the controller 39 determines that the elapsed time from the head light lighting-on time is greater than the predetermined time (S205: No), the controller 39 ends the present process (i.e., standby process) and then executes the processing following S150 of the usual state process or the processing following S355 of the booting-up process.

At S210 performed when the controller 39 determines that the elapsed time from the head light lighting-on time is equal to or less than the predetermined time, It is determined whether the acquisition of the coordinates of the position of the subject vehicle is possible. The acquisition method of the coordinates of the position of the subject vehicle is the same as that explained at S105 of the usual state process mentioned above.

When the controller 39 determines that the acquisition of the coordinates of the position of the subject vehicle is possible (S210: Yes), the controller 39 advances to S215. When it is determined that the acquisition of the coordinates of the position of the subject vehicle is impossible (S210: No), the controller 39 then returns the processing to S205 mentioned above.

At S215 performed when it is determined that the acquisition of the coordinates of the position of the subject vehicle is possible, the controller 39 acquires the coordinates of the position of the subject vehicle, and calculates the sunset time based on the acquired coordinates and the information on the present date and month. The calculation method of the sunset time is known widely; thus, explanation is omitted.

Subsequently, the controller 39 stores (i) the sunset time calculated at S215 and (ii) the time (head light lighting-on time) when it is determined that the head light is changed into the light-on state from the light-off state at S130 of the booting-up process or at S330 of the usual state process, in the storage section 34, in association with each other. The controller 39 then ends the present process (standby process), and executes the processing following S150 of the usual state process or the processing following S355 of the booting-up process. Both steps called the standby process.

The above explains the standby process. The following explains the effect acquired when the controller 39 executes the standby process. If the coordinates of the position of the subject vehicle is acquirable within the predetermined time after the lighting-on time of the head light, the controller 39 calculates the sunset time and stores it in the storage section 34 along with the lighting-on time of the head light. Such a configuration can respond to the case that, immediately after it is determined that the head light of the vehicle is switched from the light-off state to the light-on state, the position information is unacquirable from the positional information acquisition section. Thus, even in such a case, the lighting-on time of the head can remain as an evaluation target without being eliminated from it.

(3) Usual State Process

Figure 4:
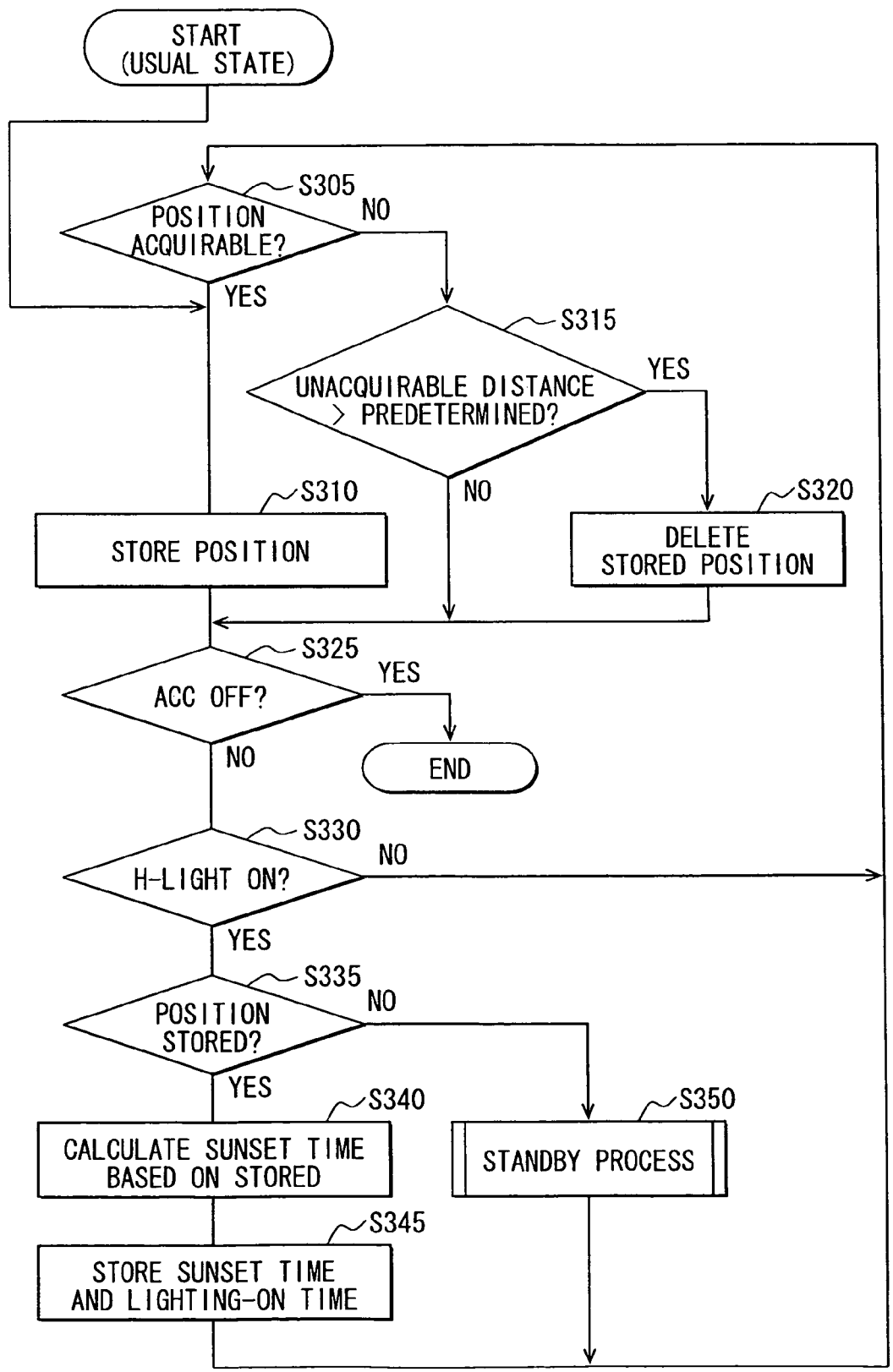
FIG. 4 is a flowchart diagram for explaining a usual state process.

Next, the usual state process is explained using a flowchart of FIG. 4. Furthermore, the present usual state process is started based on the negative determination at S105 of the booting-up process mentioned above.

The controller 39 of the navigation apparatus 20 acquires the coordinates of the position of the subject vehicle and stores it in the DRAM (S310). Furthermore, the acquisition method of the coordinates of the position of the subject vehicle is the same as that explained at S105 of the booting-up process. The controller 39 anticipates the case when the electric power supply to the navigation apparatus 20 is stopped, for instance, when the accessory switch of the vehicle is turned off. That is, the controller 39 stores periodically, in the internal flash memory, the coordinates of the position of the subject vehicle, which is stored in the DRAM. Alternatively, the controller 39 stores, in the internal flash memory, the coordinates of the position of the subject vehicle, which is stored in the DRAM just before the electric power supply is stopped.

Then, the controller 39 determines whether the accessory switch is turned off (S325). The preceding determination is made by determining whether the electric power supply from the accessory power source line to the navigation apparatus 20 is stopped. As a result, when it is determined that the accessory switch is turned off (S325: Yes), the present process (i.e., usual state process) is ended. When it is determined that the accessory switch is not turned off (S325: No), the processing advances to S330.

At S330, the controller 39 determines whether the head light is changed into the light-on state from the light-off state. The light-on state of the head light is determined based on the signal acquired from the head light sensor via the in-vehicle LAN communication section 33. As a result, it is determined that the head light is changed into the light-on state from the light-off state (S330: Yes), the processing advances to S335. In contrast, it is determined that the head light is not changed into the light-on state from the light-off state (S330: No), the processing advances to S305. Further, when it is determined that the head light is changed into the light-on state from the light-off state, the controller 39 stores the present time as a head light lighting-on time for subsequent S345 mentioned later in the DRAM.

At S335 performed when it is determined that the head light is changed into the light-on state from the light-off state, the controller 39 determines whether the coordinates of the position of the subject vehicle is stored in the DRAM inside of the controller 39. When it is determined that the coordinates of the position of the subject vehicle is stored in the DRAM (S335: Yes), the processing advances to S340. When it is determined that the coordinates of the position of the subject vehicle is not stored in the DRAM (S335: No), the processing advances to S350.

At S340 performed when it is determined that the coordinates of the position of the subject vehicle is stored in the DRAM, the controller 39 calculates the sunset time based on the coordinates stored in the DRAM and the information on the present date and month. The calculation method of the sunset time is known widely; thus, explanation is omitted.

Subsequently, the controller 39 stores (i) the sunset time calculated at S340 and (ii) the time (head light lighting-on time) when it is determined that the head light is changed into the light-on state from the light-off state at S330, in the storage section 34, in association with each other. The controller 39 then causes the processing to advance to S305 mentioned above.

At S350 performed when it is determined that the coordinates of the position of the subject vehicle is not stored in the DRAM, the controller 39 executes the standby process mentioned above. After finishing the standby process, the controller 39 causes the processing to advance to S305.

At S305, the controller 39 determines whether the coordinates of the position of the subject vehicle is acquirable. Furthermore, the acquisition method of the coordinates of the position of the subject vehicle is the same as that explained at S105 of the booting-up process. When the controller 39 determines that the acquisition of the coordinates of the position of the subject vehicle is possible (S305: Yes), the processing advances to S310. When it is determined that the acquisition of the coordinates of the position of the subject vehicle is impossible (S305: No), the processing advances to S315.

At S315 performed when it is determined that the acquisition of the coordinates of the position of the subject vehicle is impossible, the controller 39 determines whether the state where the coordinates of the position of the subject vehicle is unacquirable continues equal to or greater than a predetermined travel distance of the subject vehicle. Furthermore, the predetermined travel distance is appropriately set such that the coordinates of the position of the subject vehicle acquired most recently is separated enough from the present coordinates of the position of the subject vehicle to disable the lighting-on diagnosis of the head light at the sunset time calculated based on the coordinates acquired most recently. In other words, if the difference between the most recently acquired coordinates and the present coordinates is greater than the predetermined distance, the sunset time which is calculated based on the most recently acquired coordinates cannot be used validly in the lighting-on diagnosis.

When the controller 39 determines that the state where the coordinates of the position of the subject vehicle is unacquirable continues equal to or greater than the predetermined travel distance (S315: Yes), the processing advances to S320. In contrast, it is determined that the state where the coordinates of the position of the subject vehicle is unacquirable continues less than the predetermined travel distance (S315: No), the processing advances to S325.

At S320 performed when it is determined that the state where the coordinates of the position of the subject vehicle is unacquirable continues equal to or greater than a predetermined travel distance, the controller 39 erases the coordinates of the position of the subject vehicle stored in the inner DRAM if present. Furthermore, the relevant information is also erased if also present or stored in the inner flash memory. The controller 39 then causes the processing to advance to S325 mentioned above.

Thus the usual state process is explained. The following explains an effect or advantage acquired when the controller 39 executes the present usual state process. The controller 39 calculates the sunset time when the head light is turned on (S330:Yes, S345). As compared with the case where the sunset time is always continuously calculated, the frequency of the calculation of the sunset time (i.e., the number of times of calculation of the sunset time) is significantly reduced, and the processing load of the controller 39 is low. Further when the controller 39 determines that the head light is changed from the light-off state to the light-on state (S330:Yes), the controller 39 calculates the sunset time in the position specified based on the coordinates of the position of the subject vehicle. As compared with the case where the sunset time is calculated regardless of the lighting-on time, the calculated sunset time can evaluate the lighting-on time appropriately.

(4) Offset Time Calculation Process

Figure 5:
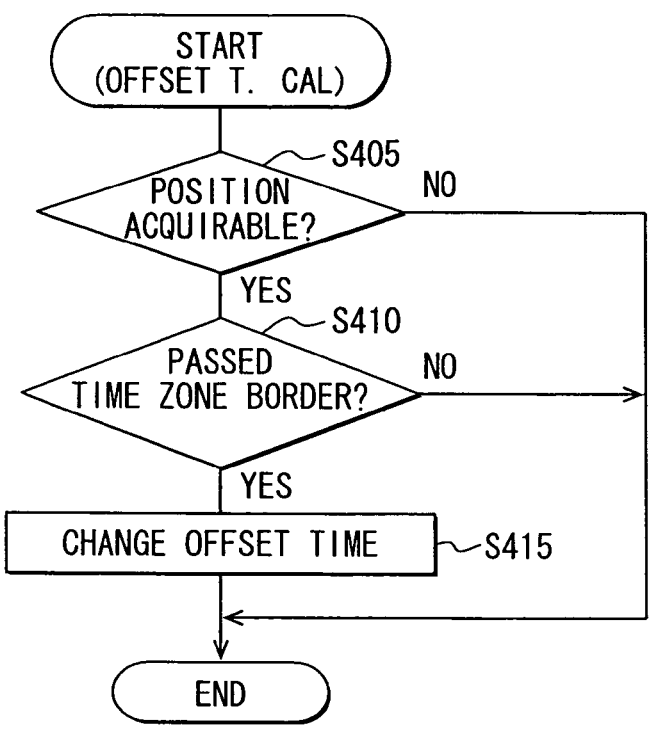
FIG. 5 is a flowchart diagram for explaining an offset time calculation process.

Next, an offset time calculation process is explained using a flowchart of FIG. 5; Furthermore, the offset time calculation process is started every fixed interval, while the electric power is supplied to the navigation apparatus 20.

The controller 39 of the navigation apparatus 20 determines first whether the coordinates of the position of the subject vehicle is acquirable (S405). Furthermore, the acquisition method of the coordinates of the position of the subject vehicle is the same as that explained at S105 of the booting-up process. When it is determined that the acquisition of the coordinates of the position of the subject vehicle is possible (S405: Yes), the processing advances to S410. When it is determined that the acquisition of the coordinates of the position of the subject vehicle is impossible (S405: No), the present process (offset time calculation process) is ended.

At S410 performed when it is determined that the acquisition of the coordinates of the position of the subject vehicle is possible, it is determined whether the subject vehicle passed through a border of a time zone based on the change of the coordinates of the position of the subject vehicle. Furthermore, the information about the border of the time zone is assumed to be stored in the ROM inside the controller 39. When the controller 39 determines that subject vehicle passed through the border of the time zone (S410: Yes), the processing advances to S415. When it is determined that the subject vehicle did not pass through the border of the time zone (S410: No), the present process (offset time calculation process) is ended.

At S415 performed when it is determined that the subject vehicle passed through the border of the time zone, an offset time is changed so as to meet with the time zone where the subject vehicle is present. The present offset time is an offset time from Greenwich Mean Time and used for calculating the sunset time or acquiring the lighting-on time of the head light. The present process (i.e., offset time calculation process) ends. Furthermore, based on the offset time changed at S415, the sunset time or the head light lighting-on time is obtained in the booting-up process, standby process, and usual state process which are mentioned above.

Thus the offset time calculation process is explained. The following explains an effect or advantage acquired when the controller 39 executes the present offset time calculation process. When the controller 39 determines that the subject vehicle passed through the border of the time zone (S410: Yes), an offset time is changed so as to meet with the time zone where the subject vehicle is present. The present offset time is an offset time from Greenwich Mean Time and used for calculating the sunset time or acquiring the lighting-on time of the head light. As compared with the case where the lighting-on time and sunset time are calculated on the basis of Greenwich Mean Time and the calculated results are stored in the storage section 34, it is easy for the driver to recognize a specific lighting-on time or sunset time intuitively when looking at the evaluation result for those times. Therefore, it is easy to urge the driver to turn on the head light beforehand.

(5) Diagnosis Process A

Figure 6:
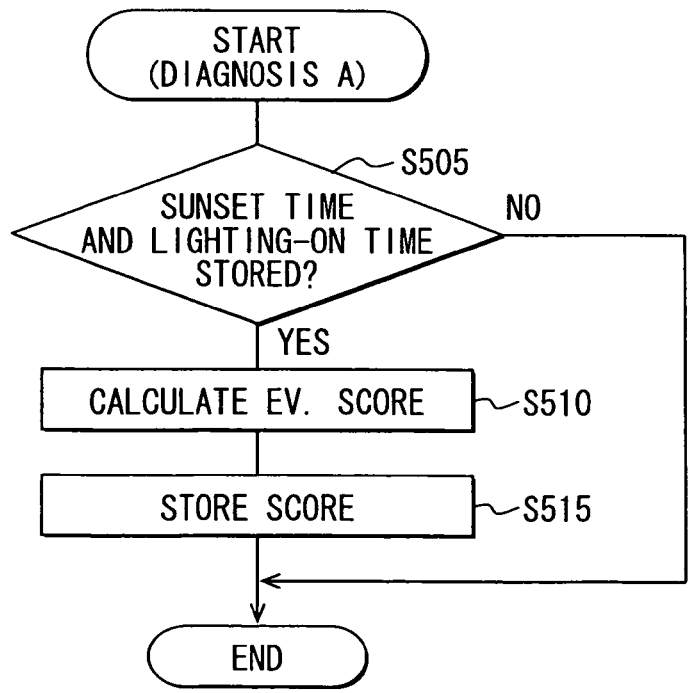
FIG. 6 is a flowchart diagram for explaining a diagnosis process A.

Next, a diagnosis process A is explained using a flowchart of FIG. 6. The diagnosis process A is to diagnose the lighting-on of the head light around the sunset time. The present process is started (i) when the subject vehicle stops during a time period from the time point 30 minutes before the sunset time to the sunset time or (ii) when the vehicle stops for the first time after the sunset time. Furthermore, the diagnosis process A is executed once per day at a maximum.

After the present process is started, the controller 39 of the navigation apparatus 20 determines whether an unsettled (not processed in the diagnosis process A) sunset time and lighting-on time of the head light are stored in the storage section 34 (S505). When it is determined that the unsettled sunset time and lighting-on time are stored in the storage section 34 (S505: Yes), the processing advances to S510. In contrast, when it is determined that the unsettled sunset time and lighting-on time are not stored in the storage section 34 (S505: No), the present process (diagnosis process A) is ended.

At S510 performed when it is determined that the unsettled sunset time and lighting-on time are stored in the storage section 34, the controller 39 calculates an evaluation score based on the unsettled sunset time and head light lighting-on time. The evaluation score is calculated based on the following expressions.

(a) the case where the vehicle travels during a time period from the time point 30 minutes before the sunset time to the sunset time $$\text{Evaluation score} = 50 + ((\text{sunset time} - \text{lighting-on time})\text{ minutes} - 15 \text{ minutes}) \times 10/3$$

Furthermore, the information on whether the vehicle traveled the above time period is assumed to be stored by the controller 39 independently of the booting-up process mentioned above. In addition, alternatively, it may be determined using the head light lighting-on time and the sunset time. In addition, the portion of the evaluation score "((sunset time–lighting-on time) minutes–15 minutes)×10/3" takes a value having a range from −50 to +50. In addition, the evaluation score rounds off values after the decimal point.

(b) the case when the head light is turned on within 2 minutes after the ignition switch is turned on assuming that the ignition switch is turned on during a time period from the time point 30 minutes before the sunset time to the sunset time Evaluation score=100

Furthermore, the time when the ignition switch is turned on is assumed to be stored by the controller 39 independently of the booting-up process mentioned above.

(c) the case when the head light is turned on greater than 2 minutes after the ignition switch is turned on assuming that the ignition switch is turned on during a time period from the time point 30 minutes before the sunset time to the sunset time $$\text{Evaluation score} = 50 + ((\text{sunset time} - \text{lighting-on time})\text{ minutes} - 15 \text{ minutes}) \times 10/3$$

Thus, the evaluation score is calculated. The controller 39 stores, in association with each other (i) the calculated evaluation score and (ii) the sunset time and head light lighting-on time, which are used as a basis for the calculation, in the storage section 34, and ends the present process (diagnosis process A). Furthermore, the stored evaluation score may be displayed in the display section 30 at the same time when it is stored in the storage section 34; alternatively, it may be transmitted to a server, which manages the evaluation score, via the wireless communication section 25 at any time or at the same time when it is stored.

The diagnosis process A is thus explained in the above. Such calculation can provide the evaluation score with a range from zero to 100 points.

(6) Tunnel Scene Process

Figure 7:
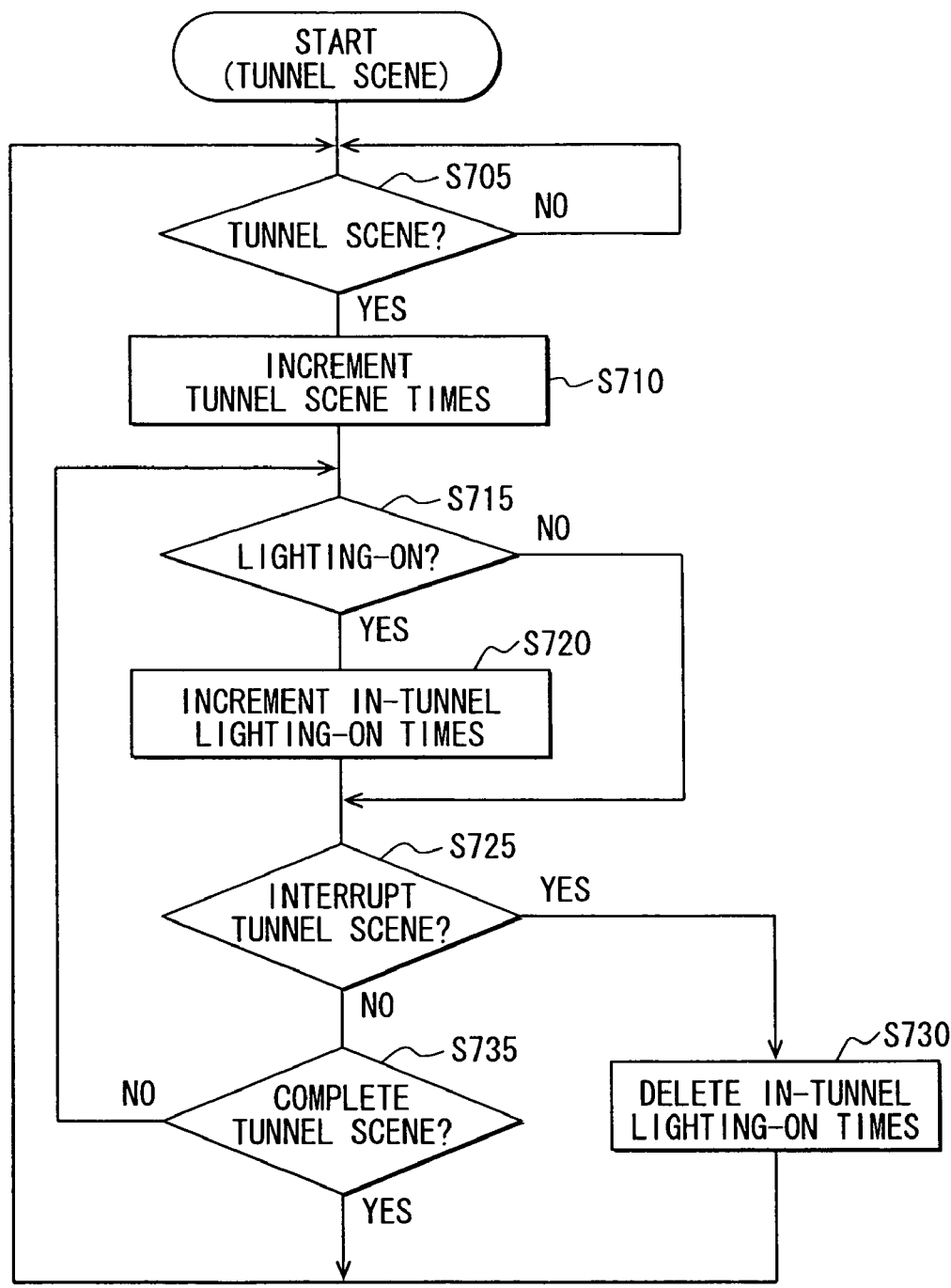
FIG. 7 is a flowchart diagram for explaining a tunnel scene process.

Next, a tunnel scene process is explained using a flowchart of FIG. 7. Furthermore, execution of the present process is started when the electric power supply to the navigation apparatus 20 is started, for instance, when the accessory switch of the vehicle is turned on or turned into an ON state from an OFF state.

The controller 39 of the navigation apparatus 20 determines first whether the present state corresponds to a tunnel scene (S705). Furthermore, the determination as to whether it corresponds to the tunnel scene is affirmed based on the following three conditions: (a) It is determined that the present position is in a tunnel by referring to the map data via the map data input section 29 based on the present position coordinates; (b) When the present position is in the tunnel, the length of the tunnel is equal to or greater than 10 m; and (c) the present time is daytime. Furthermore, whether the present time is daytime is determined based on the newest sunset time stored in the flash memory inside the controller 39. When the controller 39 determines that the present state corresponds to the tunnel scene (S705: Yes), the processing advances to S710. In contrast, when it is determined that the present state does not correspond to the tunnel scene, the processing remains at the present step (S705) until the present state becomes the tunnel scene.

At S710 performed when it is determined that the present state becomes the tunnel scene, the controller 39 increments the number of times of the tunnel scene. The number of times of the tunnel scene is one of variables provided in the flash memory inside the controller 39, and is a variable indicating the number of times the tunnel scene arising.

Next, the controller 39 determines whether the head light is in the light-on state (S715). The light-on state of the head light is determined based on the signal acquired from the head light sensor via the in-vehicle LAN communication section 33. When the controller 39 determines that the head light is in the light-on state (S715: Yes), the processing advances to S720. In contrast, when the controller 39 determines that the head light is not in the light-on state (S715: No), the processing advances to S725.

At S720 performed when it is determined that the head light is in the light-on state, the controller 39 increments the number of times of the head light lighting-on in tunnels. The number of times of the head light lighting-on in tunnels is one of variables provided in the flash memory inside the controller 39, and is a variable indicating the number of times the head light is turned on. Furthermore, the increment of the variable is restricted only one time at a maximum in one tunnel scene.

At S725, the controller 39 determines whether the tunnel scene is interrupted. One of causes of the interruption occurs when the position of the vehicle moves from inside to outside of a tunnel by the map matching function, for example.

When the controller 39 determines that the tunnel scene is interrupted (S725: Yes), the processing advances to S730. In contrast, when it is determined that the tunnel scene is not interrupted (S725: No), the processing advances to S735.

At S730 performed when it is determined that the tunnel scene is interrupted, the controller 39 cancels the increment of the number of times of the head light lighting-on in the tunnel if the number was incremented at S720. The processing returns to S705.

In contrast, at S735 performed when it is determined that the tunnel scene is not interrupted, the controller 39 determines whether the tunnel scene is completed. Unlike the above interruption, the completion of the tunnel scene signifies that the subject vehicle has traveled or passed through the tunnel completely. Thereby, the foregoing three conditions determining the tunnel scene cannot be satisfied any longer. When the controller 39 determines that the tunnel scene is completed (S735: Yes), the processing advances to S705. In contrast, when it is determined that the tunnel scene is not completed (S735: No), the processing advances to S715.

Thus the tunnel scene process is explained. If such a tunnel scene process is executed, the number of times the vehicle enters tunnels, and the number of times the head light is turned on in tunnels can be appropriately memorized.

(7) Diagnosis Process B

Figure 8:
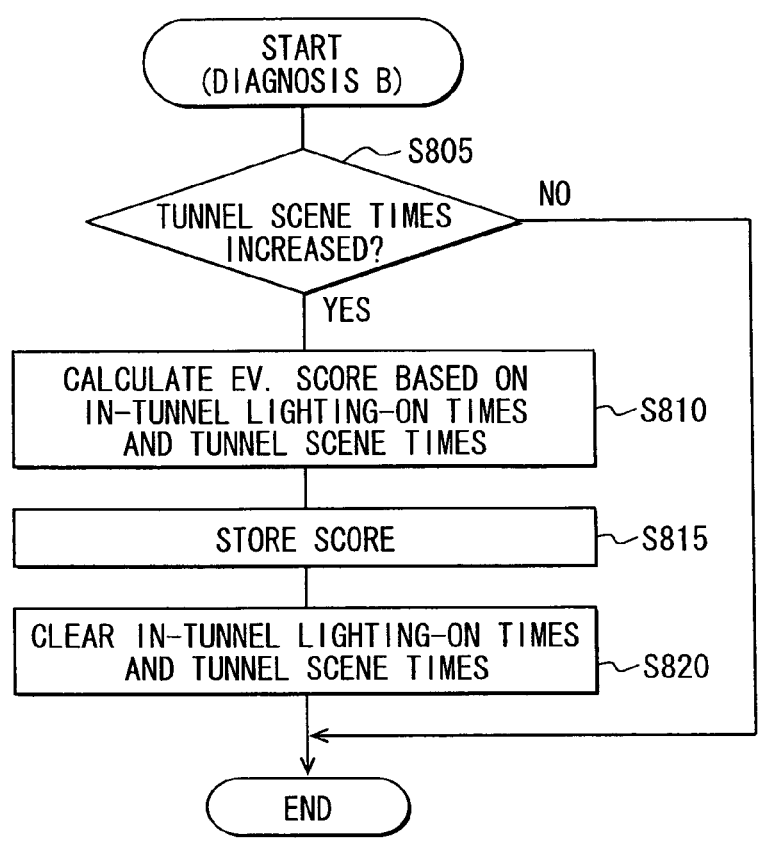
FIG. 8 is a flowchart diagram for explaining a diagnosis process B.

Next, a diagnosis process B is explained using a flowchart of FIG. 8. The diagnosis process B is to diagnose the lighting-on of the head light in tunnels. After the accessory switch is turned on, each time the subject vehicle stops, the execution of the present process is started.

After starting the execution of the diagnosis process B, the controller 39 of the navigation apparatus 20 determines whether the number of times of the tunnel scene stored in the inner flash memory increases from the previous execution (S805). When it is determined that the number of times of the tunnel scene increases from the previous execution (S805: Yes), the processing advances to S810. In contrast, when it is determined that the number of times of the tunnel scene does not increase from the previous execution (S805: No), the present process (diagnosis process B) is ended.

At S810 performed when it is determined that the number of times of the tunnel scene increases from the previous execution, the controller 39 calculates the evaluation score based on the number of times of the head light lighting-on in tunnels, and the number of times of the tunnel scene. The evaluation score is calculated based on the following expressions.

$$\text{Evaluation score} = 50 + 250 \times (\text{number of times of head light lighting-on in tunnels/number of times of tunnel scene} - 0.7) \times \text{number of times of tunnel scene}/5$$

Furthermore, "250×(number of times of head light lighting-on in tunnels/number of times of tunnel scene−0.7)" takes a value within the range from −50 to 50. For instance, the value of −175 is regarded as being −50. In addition, "number of times of tunnel scene/5" is rounded so that a value of the range from 0 to 1 is taken. In addition, the evaluation score rounds off after the decimal point.

Thus, when the evaluation score is calculated, the controller 39 makes the storage section 34 store the calculated evaluation score (S815). Furthermore, the stored evaluation score may be displayed in the display section 30 at the same time when it is stored in the storage section 34; alternatively, it may be transmitted to a server, which manages the evaluation score, via the wireless communication section 25 at any time or at the same time when it is stored.

Then, the controller 39 clears (i.e., zeros) the number of times of the head light lighting-on in tunnels and the number of times of the tunnel scene, which have been stored in the inner flash memory (S820). The controller 39 ends the present process (diagnosis process B).

The diagnosis process B is thus explained in the above. If such diagnosis process B is executed, it can be evaluated appropriately whether the head light is appropriately turned on in tunnels collectively when the subject vehicle stops after passing through tunnels.

Other Embodiments

Figure 9:
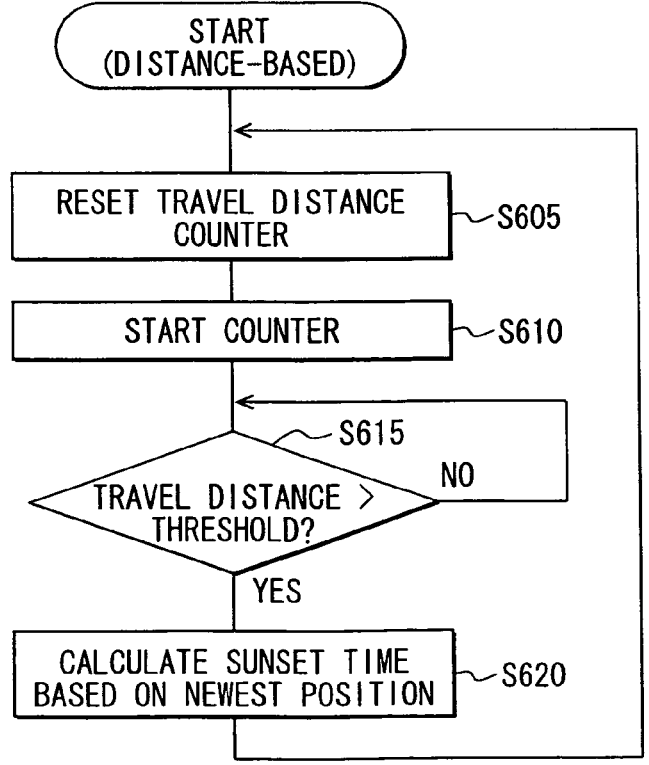
FIG. 9 is a flowchart diagram for explaining a distance-based sunset time calculation process.

The navigation apparatus 20 may execute the sunset time calculation process every predetermined travel distance (also referred to as a distance-based sunset time calculation process) instead of the processes such as the booting-up process, the standby process, and the usual state process. Irrespective of the time when the head light is turned on, each time the subject vehicle travels a predetermined distance, the sunset time is calculated. Next, the distance-based sunset time calculation process is explained using a flowchart of FIG. 9. Furthermore, the execution of the present process is started when the electric power supply to the navigation apparatus 20 is started, for instance, when the accessory switch of the vehicle is turned on or turned into an ON state from an OFF state.

The controller 39 of the navigation apparatus 20 first resets a travel distance counter provided in the inner DRAM (S605). Furthermore, the travel distance of the vehicle (on which the navigation apparatus 20 is mounted) is computable by multiplying the value of the travel distance counter by a predetermined unit distance. Then, the controller 39 starts the count-up of the travel distance counter (S610). Thereby, if the value of the travel distance counter is referred to, the travel distance after the time of resetting the travel distance counter at S605 is computable.

Then, the controller 39 determines whether the travel distance obtained from the value of the travel distance counter exceeded a predetermined threshold value (S615). The predetermined threshold value may be suitably specified as a travel distance of the subject vehicle such that if the vehicle travels the predetermined travel distance, the sunset time lacks validity in evaluating the lighting-on time of the head light. For example, it may be specified as a distance of about 10 km. Furthermore, the controller 39 calculates the moving azimuth of the vehicle based on the signal which can be acquired from the position detection section 21 before the determination at S615. When the vehicle moves in the direction of east and west, the distance of the above threshold value is specified 10% greater than a reference value while when the vehicle moves in the direction of north and south, the distance of the above threshold value is specified 10% less than the reference value.

When the controller 39 determines that the travel distance obtained from the value of the travel distance counter exceeds the predetermined threshold value (S615: Yes), the processing advances to S620. In contrast, when it is determined that the travel distance obtained from the value of the travel distance counter does not exceed the predetermined threshold value (S615: No), the processing remains at the present step until it exceeds the predetermined threshold value.

At S620 performed when it is determined that the travel distance obtained from the value of the travel distance counter exceeded the predetermined threshold value, the controller 39 calculates the sunset time based on the newest position information calculated based on the signal acquired from the position detection section 21. The controller 39 then returns the processing to S605 mentioned above. Furthermore, when the head light is turned on, the instant time (head light lighting-on time) and the sunset time calculated most recently are stored in association with each other in the storage section 34.

Thus, the sunset time calculation process (every predetermined travel distance) is explained above. In the navigation apparatus 20 thus executing, as compared with the case where the sunset time is continuously calculated, the frequency for calculating the sunset time is significantly low, thereby reducing the processing load of the navigation apparatus 20. On the assumption that the predetermined threshold value is suitably specified, the sunset time can be calculated so as to execute the appropriate evaluation of the lighting-on time of the head light.

[Functions]

The clock internally contained in the controller 39 may function as an example of a present time specification means or section. The in-vehicle LAN communication section 33 may function as an example of a light information acquisition means or section. The position detection section 21 may function as an example of a position information acquisition means or section.

In addition, steps of calculating the sunset time by the controller 39 in the booting-up process, the standby process, the usual state process, and the sunset time calculation process (every predetermined travel distance) may function as a calculation means or section. In addition, S110 in the booting-up process and S330 in the usual state process executed by the controller 39 may function as a lighting-on time specification means or section. In addition, the storage section 34 may function as an example of an evaluation information storage means or section and an in-tunnel light information storage means or section.

In addition, the flash memory contained in the controller 39 may function as an example of a position information storage means or section. In addition, S120 in the booting-up process and S315 in the usual state process executed by the controller 39 may function as an example of a control means or section or a restriction means or section.

In addition, the distance sensor 24 may function as an example of a distance information acquisition means or section. The diagnosis process A executed by the controller 39 may function as an example of a diagnosis means or section. In addition, the offset time calculation process executed by the controller 39 may function as an example of an offset time change means or section. In addition, specifying the threshold value at S615 in the sunset time calculation process (every predetermined travel distance) executed by the controller 39 may function as an example of a distance change means or section.

In addition, the diagnosis process A executed by the controller 39 may function as an example of a first evaluation means or section. The diagnosis process B executed by the controller 39 may function as an example of a second evaluation means or section. In addition, the process for the controller 39 to determine whether the present time is daytime at S705 of the tunnel scene process may function as an example of a day and night determination means or section.

Each or any combination of processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer. Furthermore, the software section or unit or any combinations of multiple software sections or units can be included in a software program, which can be contained in a computer-readable storage medium or ban be downloaded and installed in a computer via a communications network.

Aspects of the disclosure described herein are set out in the following clauses.

As an aspect of the disclosure, an information processing apparatus in a vehicle is provided as follows. A present time specification section is configured to specify a present time. A light information acquisition section is configured to acquire light information on lighting state of a head light of the vehicle. A position information acquisition section is configured to acquire position information for specifying a position where the vehicle presently exists. A calculation section is configured to calculate a sunset time in a position specified based on the position information acquired by the position acquisition section when it is determined that the head light of the vehicle is switched from a light-off state to a light-on state based on the light information acquired by the light information acquisition section. A lighting-on time specification section is configured to specify a lighting-on time when the head light of the vehicle is switched from the light-off state to the light-on state based on the present time specified by the present time specification section and the light information acquired by the light information acquisition section. An evaluation information storage section is configured to store the lighting-on time specified by the lighting-on time specification section and the sunset time calculated by the calculation section, in association with each other.

In the present information processing apparatus, as compared with the case where the sunset time is continuously calculated, the frequency for calculating the sunset time is significantly low, thereby reducing the processing load. Further, when determining that the head light is switched from the light-off state to the light-on state, the calculation section calculates the sunset time in the position specified based on the position information acquired from the position information acquisition section. Thus, as compared with the case where the sunset time is calculated regardless of the time of lighting-on, the sunset time calculated by the calculation section can evaluate the time of lighting on appropriately.

Further, it is assumed that the position information may be acquired from satellites or different apparatuses other than the information processing apparatus. In such a case, the position information may be sometimes unacquirable from such a source, the sunset time cannot be calculated. In order to prevent such a disadvantage, the following may be provided in the information processing apparatus.

That is, as an optional aspect, a position information storage section may be further configured to store the position information acquired by the position information acquisition section. Herein, the calculation section may be further configured, when the position information is not acquired by the position information acquisition section, to calculate the sunset time based on the position information stored by the position information storage section.

In such a configuration, even when the position information acquisition section cannot acquire the position information temporarily, the sunset time can be calculated, which reduces the case where the lighting-on time of the head light cannot be evaluated.

In this regard, however, when the position information stored in the position information storage section is used with a time delay, the sunset time calculated by the position information may not allow the appropriate evaluation of the lighting-on time.

Thus, as an optional aspect, a restriction section may be further configured to disable the position information stored by the position information storage section after a predetermined time period elapses or after a predetermined distance is traveled by the vehicle since the position information became unaquirable by the position information acquisition section.

Such a configuration can prevent the sunset time from being calculated based on too old position information. In addition, it is also assumed that the vehicle having the information processing apparatus is moved by a wrecker, a ferry, etc. Further, after the movement of the vehicle, the electric power supply to the information processing apparatus is started; just subsequently, the head light may be turned on. The position information on the position before the movement by the wrecker, the ferry, etc. may be read from the position information storage section and used. The foregoing case poses the possibility that the sunset time is calculated based on the unsuitable position information and stored in the evaluation information storage section. The following may be adopted to avoid the above possibility simply. Even if the head light is turned on immediately after the start of the electric power supply to the information processing apparatus, the sunset time is not calculated. The sunset time and the lighting-on time of the head light is not stored in the evaluation information storage section. In this regard, however, the evaluation of safe driving of the driver may become imperfect.

As an optional aspect, after an electric power supply to the information processing apparatus is started, a first case may arise where the calculation section calculates the sunset time based on the position information stored by the position information storage section before the position information becomes acquirable from the position information acquisition section. After the first case arises, when the position information becomes acquirable from the positional information acquisition section, the calculation section may determine a use validity of the position information stored by the position information storage section, based on the position information newly acquired from the position information acquisition section. When the use validity is affirmatively determined, the calculation section may regard the sunset time calculated when it is determined that the head light of the vehicle is changed from the light-off state to the light-on state as being valid. In contrast, when the use validity is negatively determined, the calculation section may re-calculate the sunset time based on the position information newly acquired from the position information acquisition section and the calculation section substitutes the re-calculated sunset time for the sunset time calculated when it is determined that the head light of the vehicle is changed from the light-off state to the light-on state.

Such a configuration can respond to the case that, after the movement of the vehicle, the electric power supply to the information processing apparatus is started, and, just subsequently, the head light is turned on. That is, while enabling the evaluation of the sunset time, the sunset time calculated based on the unsuitable position information can be prevented from being used for the evaluation.

In addition, when the sunset time is calculated immediately after determining that the head light of the vehicle is changed from the light-off state to the light-on state, the lighting-on time can be evaluated with sufficient accuracy. Therefore, it is desirable that the lighting-on time of the head light and the calculation time of the sunset time be close to each other. However, such a desirable case may be prevented by the present position of the vehicle, the time of starting the electric power supplying to the information processing apparatus, etc. For instance, immediately after it is determined that the head light of the vehicle is switched from the light-off state to the light-on state, the position information may be unacquirable from the positional information acquisition section or the position information storage section may not store the effective position information.

As an optional aspect, a second case may arise where the calculation section is unable to calculate the sunset time at the lighting-on time of the head light when it is determined that the head light of the vehicle is changed from the light-off state to the light-on state. After the second case arises, the calculation section may calculate a sunset time based on position information, which is newly acquired from the position information acquisition section before a predetermined time elapses since the lighting-on time or before a predetermined distance is traveled by the vehicle since the lighting-on time. The evaluation storage section may store the lighting-on time and the sunset time calculated by the calculation section, in association with each other.

Such a configuration can respond to the case that, immediately after it is determined that the head light of the vehicle is switched from the light-off state to the light-on state, the position information is unacquirable from the positional information acquisition section. That is, without precluding the lighting-on time of the head light from the evaluation even in the above case, the lighting-on time of the head light and sunset time permissible to the lighting-on time of the head light can be stored in the evaluation information storage section.

As another aspect of the disclosure, an information processing apparatus in a vehicle is provided as follows. A present time specification section is configured to specify a present time. A light information acquisition section is configured to acquire light information on lighting state of a head light of the vehicle. A position information acquisition section is configured to acquire position information for specifying a position where the vehicle presently exists. A distance information acquisition section is configured to acquire distance information for specifying a distance which the vehicle travels. A calculation section is configured to specify a distance traveled by the vehicle based on the distance information acquired from the distance information acquisition section and calculate a sunset time in the position specified based on the position information acquired by the position information acquisition section every a predetermined distance traveled by the vehicle. A lighting-on time specification section is configured to specify a lighting-on time when the head light of the vehicle is switched from the light-off state to the light-on state based on the present time specified by the present time specification section and the light information acquired by the light information acquisition section. An evaluation information storage section is configured to store the lighting-on time specified by the lighting-on time specification section and the sunset time calculated by the calculation section, in association with each other.

Furthermore, the distance traveled by the vehicle or travel distance of the vehicle acquired by the distance information acquisition section may be a distance measured along a road (equivalent to a travel distance) or a straight distance between two points on the traveled route.

In such a information processing apparatus, as compared with the case where the sunset time is continuously calculated, the frequency for calculating the sunset time is significantly low, thereby reducing the processing load. Furthermore, on the assumption that "predetermined distance" is set up appropriately, the sunset time can be calculated so as to execute the appropriate evaluation of the lighting-on time of the head light.

Furthermore, the change degree of the sunset time per predetermined travel distance is different among the east and west movement direction and the south and north movement direction with respect to the subject vehicle.

As an optional aspect, a distance change section may be further configured to change the predetermined distance according to a moving azimuth of the vehicle.

Such an information processing apparatus can calculate the sunset time at more suitable frequency.

Furthermore, as an optional aspect, a first evaluation section may be further configured to evaluate a lighting-on time of the head light based on the lighting-on time and the sunset time which are stored by the evaluation information storage section.

Such an information processing apparatus does not need to prepare any evaluation apparatus, which evaluates the lighting-on time of the head light, separately therefrom. In addition, when the sunset time is calculated as mentioned above, based on the calculated sunset time, another evaluation other than that of the head light lighting-on prior to the sunset time.

As an optional aspect, a day and night determination section may be further configured to determine whether a present time is daytime or nighttime based on a newest sunset time calculated by the calculation section. An in-tunnel light information storage section may be further configured to store a number of tunnels the vehicle traveled and a number of in-tunnel lighting-on undergone by the head light of the vehicle in tunnels. A second evaluation section may be further configured to evaluate lighting-on of the head light in tunnels based on the number of tunnels and the number of in-tunnel lighting-on of the head light.

Such an information processing apparatus can effectively evaluate safe driving from another viewpoint by utilizing the calculated sunset information.

As an optional aspect an offset time change section may be further configured, when it is determines that the vehicle passed a border of a time zone based on a present position of the vehicle specified based on the position information acquired from the position information acquisition section, to amend an offset time, which is based on Greenwich Mean Time, the offset time being used when calculating the lighting-on time and the sunset time.

Such an information processing apparatus can provide an advantage as compared with the case where the lighting-on time and sunset time are calculated on the basis of Greenwich Mean Time and stored in the evaluation information storage section. That is, it is easy for a driver looking at a specific lighting-on time and sunset time to intuitively recognize them. Therefore, such an information processing apparatus can easily urge the lighting-on of the head light beforehand.

It will be obvious to those skilled in the art that various changes may be made in the above-described embodiments of the present invention. However, the scope of the present invention should be determined by the following claims.

What is claimed is:

1. An information processing apparatus in a vehicle, the apparatus comprising:
- a present time specification section configured to specify a present time;
- a light information acquisition section configured to acquire light information on lighting state of a head light of the vehicle;
- a position information acquisition section configured to acquire position information for specifying a position where the vehicle presently exists;
- a calculation section configured to calculate a sunset time in a position specified based on the position information acquired by the position acquisition section when it is determined that the head light of the vehicle is switched from a light-off state to a light-on state based on the light information acquired by the light information acquisition section;
- a lighting-on time specification section configured to specify a lighting-on time when the head light of the vehicle is switched from the light-off state to the light-on state based on the present time specified by the present time specification section and the light information acquired by the light information acquisition section; and
- an evaluation information storage section configured to store the lighting-on time specified by the lighting-on time specification section and the sunset time calculated by the calculation section, in association with each other.

2. The information processing apparatus according to claim 1, further comprising:
- a position information storage section configured to store the position information acquired by the position information acquisition section,
- the calculation section being further configured, when the position information is not acquired by the position information acquisition section, to calculate the sunset time based on the position information stored by the position information storage section.

3. The information processing apparatus according to claim 2, further comprising:
- a restriction section configured to disable the position information stored by the position information storage section after a predetermined time period elapses or after a predetermined distance is traveled by the vehicle since the position information became unacquirable by the position information acquisition section.

4. The information processing apparatus according to claim 2,
wherein after an electric power supply to the information processing apparatus is started, a first case arises where the calculation section calculates the sunset time based on the position information stored by the position information storage section before the position information becomes acquirable from the position information acquisition section;
wherein after the first case arises, when the position information becomes acquirable from the positional information acquisition section, the calculation section determines a use validity of the position information stored by the position information storage section, based on the position information newly acquired from the position information acquisition section;
wherein when the use validity is affirmatively determined, the calculation section regards the sunset time calculated when it is determined that the head light of the vehicle is changed from the light-off state to the light-on state as being valid; and
wherein when the use validity is negatively determined, the calculation section re-calculates the sunset time based on the position information newly acquired from the position information acquisition section and the calculation section substitutes the re-calculated sunset time for the sunset time calculated when it is determined that the head light of the vehicle is changed from the light-off state to the light-on state.

5. The information processing apparatus according to claim 1,
wherein a second case arises where the calculation section is unable to calculate the sunset time at the lighting-on time of the head light when it is determined that the head light of the vehicle is changed from the light-off state to the light-on state;
wherein after the second case arises, the calculation section calculates a sunset time based on position information, which is newly acquired from the position information acquisition section before a predetermined time elapses since the lighting-on time or before a predetermined distance is traveled by the vehicle since the lighting-on time; and
wherein the evaluation storage section stores the lighting-on time and the sunset time calculated by the calculation section, in association with each other.

6. The information processing apparatus according to claim 1, further comprising:
- a first evaluation section configured to evaluate a lighting-on time of the head light based on the lighting-on time and the sunset time which are stored by the evaluation information storage section.

7. The information processing apparatus according to claim 1, further comprising:
- a day and night determination section configured to determine whether a present time is daytime or nighttime based on a newest sunset time calculated by the calculation section;
- an in-tunnel light information storage section configured to store a number of tunnels the vehicle traveled and a number of in-tunnel lighting-on undergone by the head light of the vehicle in tunnels; and
- a second evaluation section configured to evaluate lighting-on of the head light in tunnels based on the number of tunnels and the number of in-tunnel lighting-on of the head light.

8. The information processing apparatus according to claim 1, further comprising:
- an offset time change section configured, when it is determines that the vehicle passed a border of a time zone based on a present position of the vehicle specified based on the position information acquired from the position information acquisition section, to amend an offset time, which is based on Greenwich Mean Time, the offset time being used when calculating the lighting-on time and the sunset time.

* * * * *